United States Patent
Masuda (10) Patent No.: US 10,427,661 B2
(45) Date of Patent: Oct. 1, 2019

(54) ELECTRIC BRAKE DEVICE

(71) Applicant: NTN CORPORATION, Osaka (JP)

(72) Inventor: Yui Masuda, Iwata (JP)

(73) Assignee: NTN CORPORATION, Osaka (JP)

( * ) Notice: Subject to any disclaimer, the term of this patent is extended or adjusted under 35 U.S.C. 154(b) by 61 days.

(21) Appl. No.: 15/711,503

(22) Filed: Sep. 21, 2017

(65) Prior Publication Data
US 2018/0009426 A1     Jan. 11, 2018

Related U.S. Application Data

(63) Continuation of application No. PCT/JP2016/058611, filed on Mar. 17, 2016.

(30) Foreign Application Priority Data

Mar. 26, 2015 (JP) .................................. 2015-063675

(51) Int. Cl.
*B60T 13/74* (2006.01)
*F16D 65/18* (2006.01)

(52) U.S. Cl.
CPC ............ *B60T 13/746* (2013.01); *B60T 13/74* (2013.01); *F16D 65/18* (2013.01)

(58) Field of Classification Search
CPC .... B60T 13/746; F16D 65/18; F16D 2124/24; F16D 2066/003
See application file for complete search history.

(56) References Cited

U.S. PATENT DOCUMENTS

| | | | |
|---|---|---|---|
| 7,445,091 B2* | 11/2008 | Kawahara | B60T 8/00 188/1.11 L |
| 7,810,616 B2 | 10/2010 | Nakazeki | |
| 8,676,409 B2 | 3/2014 | Takeda et al. | |
| 9,221,442 B2* | 12/2015 | Yasui | B60T 8/171 |
| 9,505,385 B2 | 11/2016 | Yasui et al. | |

(Continued)

FOREIGN PATENT DOCUMENTS

| CN | 102207145 A | 10/2011 |
|---|---|---|
| CN | 103373337 A | 10/2013 |

(Continued)

OTHER PUBLICATIONS

International Search Report dated May 24, 2016 in corresponding International Patent Application No. PCT/JP2016/058611.

(Continued)

*Primary Examiner* — Vishal R Sahni (57) ABSTRACT

An electric brake device includes: a brake rotor; a friction member; friction member contactor; an electric motor; braking force estimation unit; and a control device. The control device has a control system in which a motor rotation angle of the electric motor is included in a state quantity in a control computing of a follow-up control. The control device includes a state quantity reset function unit that resets at least the motor rotation angle to a predetermined value, on the basis of a predetermined condition using at least one of a target braking force, an estimated value of a braking force, an amount of change of a target braking force, an amount of change of an estimated value of a braking force, and a deviation between a target braking force and an estimated value of the braking force.

3 Claims, 6 Drawing Sheets

(56) References Cited

U.S. PATENT DOCUMENTS

| | | | |
|---|---|---|---|
| 2007/0199773 A1* | 8/2007 | Saito | B60T 8/321 |
| | | | 188/72.1 |
| 2008/0059023 A1* | 3/2008 | Ueno | B60T 1/10 |
| | | | 701/36 |
| 2008/0110704 A1 | 5/2008 | Nakazeki | |
| 2009/0218179 A1* | 9/2009 | Yokoyama | B60T 13/741 |
| | | | 188/1.11 L |
| 2011/0246039 A1 | 10/2011 | Takeda et al. | |
| 2015/0112565 A1 | 4/2015 | Yasui et al. | |
| 2016/0001752 A1 | 1/2016 | Yasui et al. | |
| 2017/0009830 A1* | 1/2017 | Masuda | B60T 13/741 |

FOREIGN PATENT DOCUMENTS

| | | |
|---|---|---|
| EP | 2 799 298 A1 | 11/2014 |
| JP | 6-327190 | 11/1994 |
| JP | 2000-130482 | 5/2000 |
| JP | 2003-175811 | 6/2003 |
| JP | 2006-194356 | 7/2006 |
| JP | 2008-184023 | 8/2008 |
| WO | WO 2014/115872 A1 | 7/2014 |
| WO | WO 2014/142336 A1 | 9/2014 |

OTHER PUBLICATIONS

International Preliminary Report on Patentability dated Oct. 5, 2017 in corresponding International Patent Application No. PCT/JP2016/058611.

European Office Action dated Oct. 24, 2018 in corresponding European Patent Application No. 16768649.2.

Japanese Office Action dated Oct. 16, 2018 in corresponding Japanese Patent Application No. 2015-063675.

Chinese Office Action dated Mar. 19, 2019 in related Chinese Patent Application No. 201680018253.9 (12pgs).

* cited by examiner

ELECTRIC BRAKE DEVICE

CROSS REFERENCE TO THE RELATED APPLICATION

This application is a continuation application, under 35 U.S.C. § 111(a), of international application No. PCT/JP2016/058611, filed Mar. 17, 2016, which is based on and claims Convention priority to Japanese patent application No. 2015-63675, filed Mar. 26, 2015, the entire disclosure of which is herein incorporated by reference as a part of this application.

BACKGROUND OF THE INVENTION

Field of the Invention

The present invention relates to an electric brake device, and relates to a technique that allows a control system to be easily designed without making brake feeling worse.

Description of Related Art

For the electric brake device, the following techniques are suggested.
1. An electric linear actuator in which a planetary roller screw mechanism is used (Patent Document 1).
2. An actuator, for an electric brake, which converts rotary motion of a motor to linear motion through a linear motion mechanism by pressing a brake pedal, and brings a brake pad into pressure contact with a brake disc, thereby applying a braking force (Patent Document 2).

RELATED DOCUMENT

Patent Document

[Patent Document 1] JP Laid-open Patent Publication No. 2006-194356
[Patent Document 2] JP Laid-open Patent Publication No. H06-327190

The electric brake device as disclosed in Patent Document 1, 2 is required to have a function of causing an estimated braking force such as pad pressing force to follow a target braking force in general. However, in designing of a servo control device of an electric motor, in a case where a target value is a required braking force, and a control variable is an estimated braking force, since a control parameter includes a non-linear spring constant κ formed of stiffness of the electric brake device as indicated in the following equation, a problem arises that designing of a control system becomes difficult. In general, in the case of, for example, a disc brake, the spring constant κ varies by a factor of about 10 to 100 times if maximum.

$$\frac{d}{dt}x(t) = \begin{bmatrix} 0 & 1 \\ 0 & 1 \end{bmatrix} x(t) + \begin{bmatrix} 0 \\ K_\tau \cdot J^{-1} \end{bmatrix} u(t) \; x(t) = \begin{bmatrix} \theta \\ \omega \end{bmatrix} \quad \text{[Equation 1]}$$

$$y(t) = [\kappa \; 0] x(t) \; u(t) = I_M$$

$I_M$: Motor current
$K_\tau$: Torque constant
$J$: Moment of inertia
$\kappa$: Spring constant Meanwhile, in a case where the target value is a required motor angle, and a control variable is a motor angle, [κ 0] becomes [1 0] in the above-described equation, and representation as a linear system can be entirely enabled, whereby a controller is easily designed. However, when the motor angle is included in the calculation, a value of the motor angle is likely to become very large, and a problem arises that increase of calculation load or overflow of a variable occurs more frequently.

In order to address the aforementioned problem, a process of sequentially resetting the value of x(t) described above is usually performed. However, due to, for example, digits after the decimal point being rounded down, when x(t) is reset, the value of the operation amount u(k) varies, and an electric actuator may operate in an undesired manner. When this problem arises in the electric brake device, braking shock, worse operation noise, or the like are generated, whereby brake feeling may become worse.

SUMMARY OF THE INVENTION

An object of the present invention is to provide an electric brake device that allows a control system to be easily designed without making brake feeling worse.

Hereinafter, for easy understanding of the present invention, reference characters in embodiment are used in the following description for convenience sake.

An electric brake device of the present invention includes: a brake rotor 8; a friction member 9 configured to be brought into contact with the brake rotor 8; a friction member contactor 6 configured to bring the friction member 9 into contact with the brake rotor 8; an electric motor 4 configured to drive the friction member contactor 6; a braking force estimation unit 28 configured to obtain an estimated value of a braking force generated by the friction member 9 being pressed against the brake rotor 8; and a control device 2 configured to control the electric motor 4 to perform a follow-up control of the braking force with respect to a target braking force.

The control device 2 has a control system in which a motor rotation angle of the electric motor 4 is included in a state quantity in a control computing of the follow-up control. The control device 2 includes a state quantity reset function unit 25 that resets at least the motor rotation angle to a predetermined value, on the basis of a predetermined condition using at least one of the target braking force, the estimated value of the braking force, an amount of change of the target braking force, an amount of change of the estimated value of the braking force, and a deviation between the target braking force and the estimated value of the braking force.

The predetermined condition is determined according to a result of an experiment, simulation, or the like such that influence of the condition on brake feeling is small. The predetermined value is also determined according to a result of an experiment, simulation, or the like.

In this configuration, the control device 2 controls the electric motor 4 to perform a control (hereinafter, referred to as "follow-up control") for causing the braking force to follow the target braking force. The control device 2 has the control system in which the motor rotation angle is included in the state quantity in the follow-up control, and a linear control system can be thus obtained. Therefore, as compared to a conventional art in which a control parameter includes a non-linear spring constant formed of stiffness of an electric brake device, the control system can be more easily designed.

Since the control device 2 has the control system in which the motor rotation angle is included in a state quantity in the follow-up control, a problem arises that a value of the motor rotation angle becomes very large. However, the state quantity reset function unit 25 resets the motor rotation angle that is the state quantity as described below, and the problem can be thus prevented. In the control device 2, the state quantity reset function unit 25 resets at least the motor rotation angle to the predetermined value, on the basis of the predetermined condition using at least one of the target braking force, the estimated value of the braking force, the amount of change of the target braking force, the amount of change of the estimated value of the braking force, and the deviation between the target braking force and the estimated value of the braking force. Thus, increase of calculation load can be inhibited, and occurrence of overflow of a variable can be prevented. The state quantity reset function unit 25 resets the motor rotation angle when a condition that is less likely to influence brake feeling is satisfied as the predetermined condition. Therefore, even if an operation amount is varied according to the motor rotation angle being reset, a driver is less likely to perceive brake feeling worse.

The state quantity reset function unit 25 of the control device 2 may reset at least the motor rotation angle to the predetermined value, when a condition that an absolute value of the amount of change of the target braking force is less than or equal to a set value, and an absolute value of the deviation between the target braking force and the estimated value of the braking force is less than or equal to a threshold value, is satisfied as the predetermined condition. The set value and the threshold value are respectively determined according to a result of an experiment, simulation, or the like.

In a case where the absolute value of the amount of change of the target braking force is less than or equal to a set value, and the absolute value of the deviation between the target braking force and the estimated value of the braking force is less than or equal to a threshold value, it can be considered that the electric brake device DB maintains the braking force almost at a constant value. At this time, within a friction hysteresis loop of the electric brake device DB, even if an operation amount is varied according to the motor rotation angle that is a state quantity being reset, the braking force does not vary. Therefore, when the predetermined condition is set as the above-described condition, the motor rotation angle can be reset without making brake feeling worse for a driver of a vehicle having the electric brake device DB mounted therein The state quantity reset function unit 25 of the control device 2 may reset at least the motor rotation angle to the predetermined value, when a condition that one or both of:

the absolute value of the deviation between the target braking force and the estimated value of the braking force and a driving force, of the electric motor 4, determined on the basis of the deviation, is greater than or equal to a threshold value, is satisfied as the predetermined condition. The threshold value is determined according to a result of an experiment, simulation, or the like.

In a case where the absolute value of the deviation between the target braking force and the estimated value of the braking force is greater than or equal to a threshold value, it can be considered that, by, for example, braking operation being abruptly performed, the electric brake device DB is operating at a very high speed. In this case, even if the operation amount is varied according to the motor rotation angle that is the state quantity being reset, a driver is less likely to perceive brake feeling worse. When the above-described deviation is great, it can be considered that motor output saturation is highly likely to occur. In such a case, it can be considered that varying of an operation amount itself according to the state quantity being reset, is less likely to occur.

However, the above-described condition, that is, the condition that the absolute value of the amount of change of the target braking force is less than or equal to the set value, and the absolute value of the deviation between the target braking force and the estimated value of the braking force is less than or equal to the threshold value, or the condition that one or both of:

the absolute value of the deviation between the target braking force and the estimated value of the braking force and a driving force, of the electric motor 4, determined on the basis of the deviation, is greater than or equal to the threshold value, does not completely ensure inhibition of overflow in all braking operations by drivers. Therefore, in order to address a very limited state in which the motor rotation angles are continuously integrated in a state where the above-described condition is not satisfied, the state quantity reset function unit 25 of the control device 2 may forcibly reset at least the motor rotation angle when at least the absolute value of the motor rotation angle is greater than or equal to a threshold value. The threshold value is determined according to a result of an experiment, simulation, or the like.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views.

DESCRIPTION OF EMBODIMENTS

Figure 1:
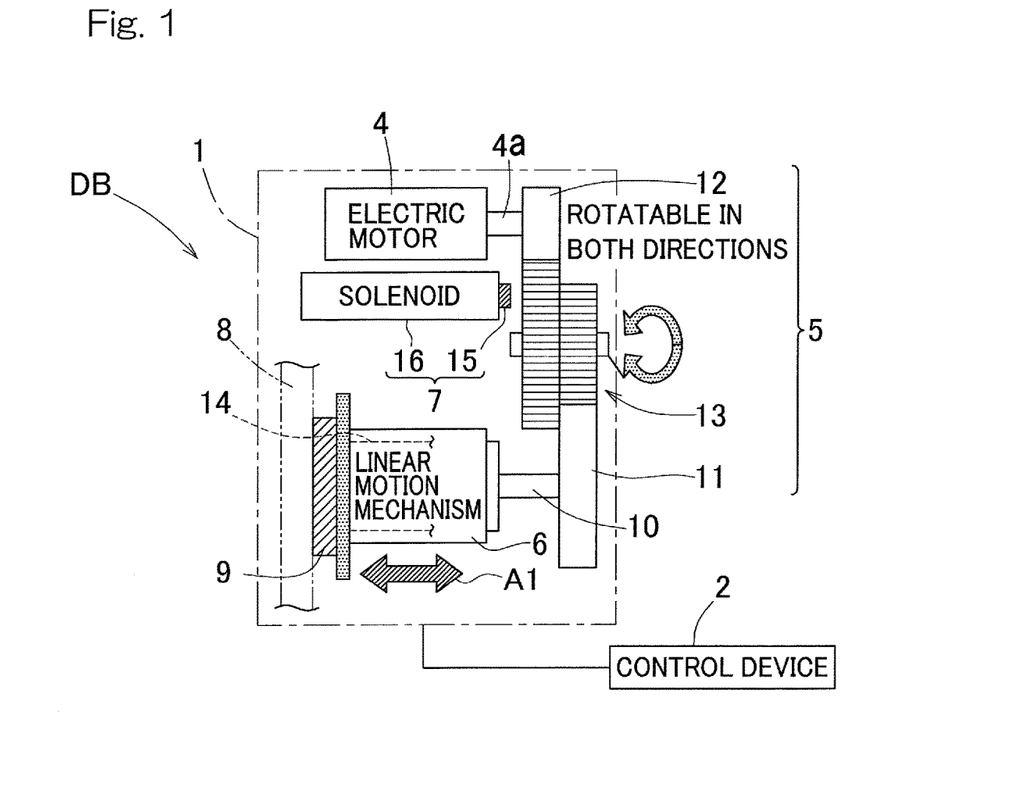
FIG. 1 schematically illustrates an electric brake device according to an embodiment of the present invention.
Figure 2:
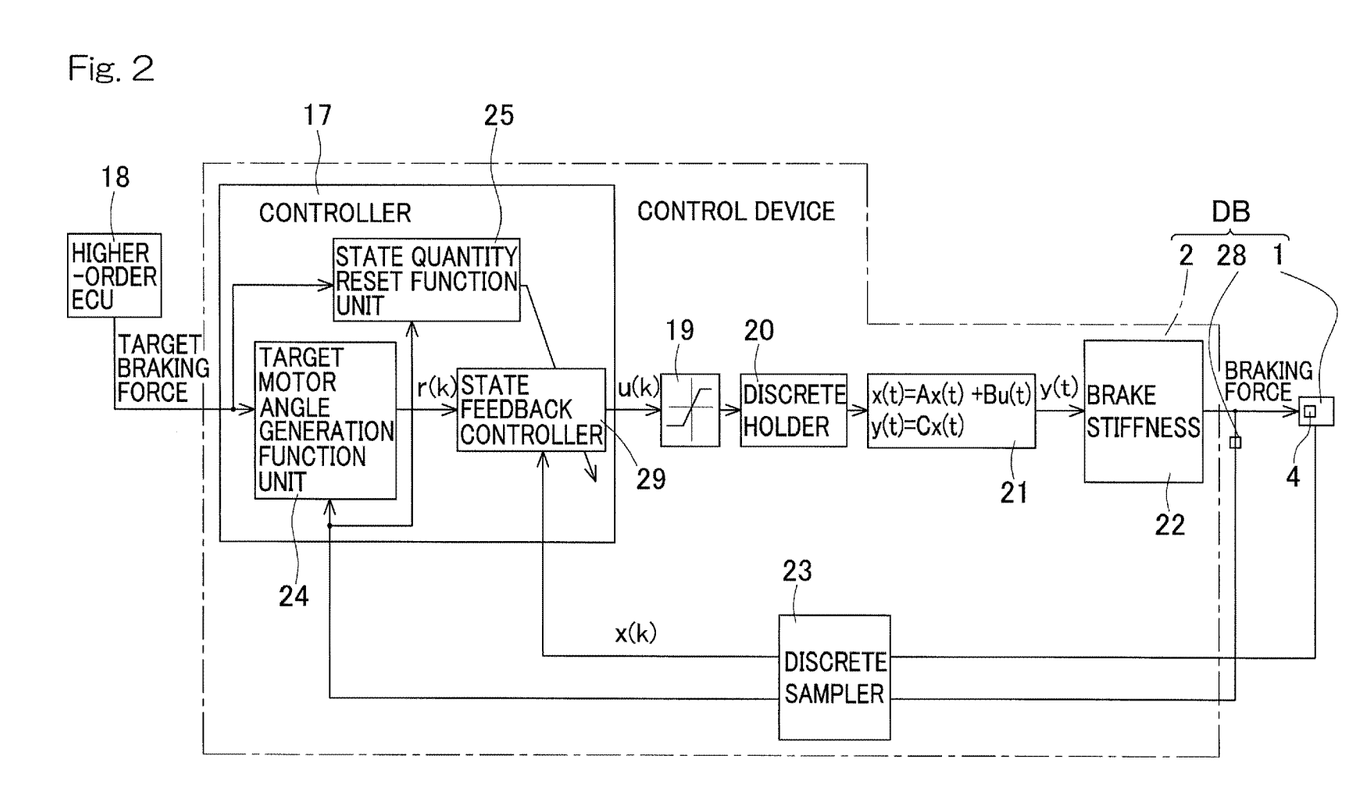
FIG. 2 is a block diagram illustrating a control system of the electric brake device.

An electric brake device according to an embodiment of the present invention will be described with reference to FIGS. 1 to 5. As shown in FIG. 1, an electric brake device DB includes an electric actuator 1, a control device 2, and a braking force estimation unit 28 (FIG. 2). Firstly, the electric actuator 1 will be described.

The electric actuator 1 includes: an electric motor 4; a speed-reducing mechanism or speed reduction gear 5 that reduces a speed of rotation or number of rotation per unit time of the electric motor 4; a linear motion mechanism 6; a parking brake mechanism 7 that is a parking brake; a brake rotor 8; and a friction member 9. The electric motor 4, the speed-reducing mechanism 5, and the linear motion mechanism 6 are incorporated in, for example, a not-illustrated housing. The brake rotor 8 rotates integrally with a not-illustrated wheel, and may be a disc-type one or a drum-type one. The friction member 9 is implemented by a brake pad, a brake shoe, or the like. The linear motion mechanism 6 is implemented by a feed screw mechanism such as a ball screw mechanism, or a planetary roller screw mechanism.

The electric motor 4 is a three-phase synchronous motor, or the like. The speed-reducing mechanism 5 reduces the speed of the rotation of the electric motor 4 and transmits the reduced rotation to a tertiary gear 11 fixed to a rotation shaft 10 of the linear motion mechanism 6, and includes a primary gear 12, an intermediate (secondary) gear 13, and the tertiary gear 11. In this example, the speed-reducing mechanism 5 can reduce the speed of the rotation of the primary gear 12 attached to a rotor shaft 4a of the electric motor 4, by the intermediate gear 13 in which, for example, two layers of gears, which are concentric with each other and have different radii, integrally rotate, and can transmit the reduced rotation to the tertiary gear 11 fixed to the end portion of the rotation shaft 10.

The linear motion mechanism 6 that is a friction member contactor converts rotary motion outputted by the speed-reducing mechanism 5 to linear motion performed by a linear motion portion 14, by using the feed screw mechanism, and brings the friction member 9 into contact with the brake rotor 8 or separates the friction member 9 from the brake rotor 8. The linear motion portion 14 is prevented from rotating and is supported so as to be movable in an axial direction indicated by arrows A1. The friction member 9 is disposed at the end, on the outboard side, of the linear motion portion 14. The rotation of the electric motor 4 is transmitted to the linear motion mechanism 6, and the rotary motion is thus converted to linear motion, and the linear motion is converted to a pressing force of the friction member 9, thereby generating a braking force. In a state where the electric brake device DB is mounted to a vehicle, the outer side, in the vehicle width direction, of the vehicle is referred to as the outboard side, and the center side of the vehicle is referred to as an inboard side.

The parking brake mechanism 7 will be described. The parking brake mechanism 7 includes a locking member 15 and an actuator 16. In the end surface, on the outboard side, of the intermediate gear 13, a plurality of locking holes (not shown) are formed so as to be equally spaced from each other in the circumferential direction. The locking member 15 can be locked into one of the locking holes. The actuator 16 is implemented by, for example, a linear solenoid. The locking member (solenoid pin) 15 is advanced by the actuator 16, and the locking member 15 is fitted into the locking hole formed in the intermediate gear 13, and is thus locked, whereby the intermediate gear 13 is prohibited from rotating, and a parking lock state is achieved. A part or the entirety of the locking member 15 is retracted into the actuator 16, and the locking member 15 is disengaged from the locking hole, whereby the intermediate gear 13 is allowed to rotate and an unlocked state can be achieved.

The control device 2 and the like will be described. As shown in FIG. 2, the control device 2 is a device that controls the electric actuator 1 to be controlled. More specifically, the control device 2 has a function of controlling the electric motor 4 to perform control (follow-up control) such that the braking force follows a target braking force. To the control device 2, a higher-order ECU 18 that is higher-order control unit of the control device 2 is connected. In a case where a plurality of electric brake devices DB are mounted to the vehicle, each of the control devices 2 of the electric brake devices DB is connected to the higher-order ECU 18. The higher-order ECU 18 is implemented by, for example, an electric control unit that performs overall control of the vehicle. The higher-order ECU 18 generates the target braking force by using, for example, a LUT (Look Up Table) implemented by software or hardware, or a predetermined transform function contained in a library of software or hardware equivalent to the transform function (hereinafter, referred to as an "embodied model"), according to an output from a sensor (not shown), which varies according to an operation amount of a not-illustrated brake pedal, and outputs the target braking force to the control device 2 of the electric brake device DB.

The control device 2 performs a follow-up control for performing feedback of a braking force with respect to the target braking force obtained from the higher-order ECU 18. The control device 2 includes: a controller 17; a limiter circuit 19; a discrete holder 20; an equation calculation unit 21 that includes state transition matrixes A, B, C to be controlled; a spring constant multiplication unit 22 containing brake stiffness; and a discrete sampler 23. The discrete holder 20 has a function of outputting, as a continuous amount between calculation samples, an output calculated by the controller 17 which is implemented by a digital calculation element such as a microcomputer or an ASIC, and the discrete holder 20 is implemented by, for example, a switching element that generates a PWM output at a predetermined duty ratio in motor control. The discrete sampler 23 has a function of performing discretization and sampling of a continuous amount of signals from a sensor or the like as input of each calculation sample in the digital calculation element, and the discrete sampler 23 is implemented by, for example, an A/D converter.

The state transition matrixes A, B, C may be obtained according to a physical characteristic value such as an electric actuator inertia, and may be simplified by, for example, a part of the state transition matrixes being not used according to need. The controller 17 is a control system in which a motor rotation angle of the electric motor 4 is included in a state quantity x(k) in the follow-up control. An angular velocity of the electric motor 4 as well as the motor rotation angle may be included in the state quantity x(k). The controller 17 includes a target motor angle generation function unit 24, a state quantity reset function unit 25, and a state feedback controller 29.

The target motor angle generation function unit 24 is implemented by a software function in a processor (not shown) or a hardware circuit which can generate and output a target motor angle that is a target state quantity r(k) of the electric motor 4, specifically, by using the above-described embodied model, from: an estimated value of a braking force (referred to as "braking force estimated value"), which is estimated by the braking force estimation unit 28 (described below) and further extracted through the discrete sampler 23; and the target braking force obtained from the higher-order ECU 18. In this example, the state quantity reset function unit 25 is implemented by a software function in a processor (not shown) or a hardware circuit that can receive input of: the target braking force obtained from the higher-order ECU 18; and a deviation ΔF between the target braking force and the above-described braking force estimated value, and can reset, to a predetermined value $x_0$, the motor rotation angle (motor angle) that is the state quantity, specifically, by using the embodied model, and can output the value $x_0$. The state quantity reset function unit 25 resets the motor rotation angle that is the state quantity when a predetermined condition (described later) is satisfied.

The state feedback controller 29 is implemented by a software function in a processor (not shown) or a hardware circuit which can calculate and output an operation amount u(k), specifically, by using the embodied model, from: the target state quantity r(k) obtained from the target motor angle generation function unit 24; the state quantity x(k) which is obtained from, for example, sensing information of the electric motor 4 and extracted through the discrete sampler 23; and a reset signal obtained as necessary (in other words, when the predetermined condition is satisfied) from the state quantity reset function unit 25. The operation amount u(k) represents a motor torque, a motor voltage, or the like.

Examples of the sensing information of the electric motor 4 include a motor current value detected by a current detector (not shown), a motor angle estimated by a rotation angle estimation unit (not shown), or the like. The current detector may be, for example, a current sensor, and may estimate the motor current value according to: motor specifications such as a resistance value and an inductance value as previously measured; and a motor voltage. The rotation angle estimation unit may be, for example, an angle sensor such as a magnetic encoder or a resolver, and may estimate the motor angle, by using a physical equation, according to the motor specifications and the motor voltage.

A braking force of the electric brake device DB is estimated by the braking force estimation unit 28. The braking force estimation unit 28 may be, for example, a load sensor that detects a load of the electric actuator 1, may calculate the braking force estimated value according to information from, for example, an acceleration sensor or a wheel speed sensor of a vehicle having this electric brake device mounted therein, and may calculate the braking force estimated value from the characteristics of the electric actuator 1 and the sensing information of the electric motor 4 as described above.

The load sensor is implemented by, for example, a magnetic-type sensor (not shown). When the friction member 9 shown in FIG. 1 presses the brake rotor 8, a reaction force toward the inboard side acts onto the linear motion portion 14. The load sensor implemented by a magnetic-type sensor magnetically detects the reaction force of the braking force as a displacement in the axial direction. As shown in FIG. 2, a relationship between the reaction force of the braking force and the sensor output is previously obtained by an experiment or the like and is set in the form of a table or the like, in the braking force estimation unit 28, which can estimate the braking force on the basis of the sensor output from the load sensor. As the load sensor, an optical-type, an eddy-current-type, or an electrostatic-capacitance-type sensor, which is other than a magnetic-type sensor, can be used.

The limiter circuit 19 regulates or limits the operation amount u(k) obtained from the state feedback controller 29 such that the operation amount u(k) is less than or equal to a set value. In a case where the operation amount u(k) represents, for example, a motor voltage, the limiter circuit 19 regulates an output voltage such that the output voltage is lower than or equal to a set voltage. A continuous amount of the operation amount u(k) outputted through the limiter circuit 19 and the discrete holder 20 is inputted to the equation calculation unit 21 for calculating a control variable y(t). The control variable y(t) may be one or both of a motor rotation angle and a motor rotation angular velocity. The target state quantity r(k) may be one or both of a target motor angle and a target motor rotation angular velocity. The control variable y(t) is outputted as a braking force by a spring constant or coefficient κ being taken into consideration by the spring constant multiplication unit 22 containing brake stiffness. Finally, for controlling a braking force, the target motor rotation angle can be determined according to a correlation between the previously measured motor rotation angle and the braking force calculated on the basis of the sensor output from the load sensor or the like.

Figure 3:
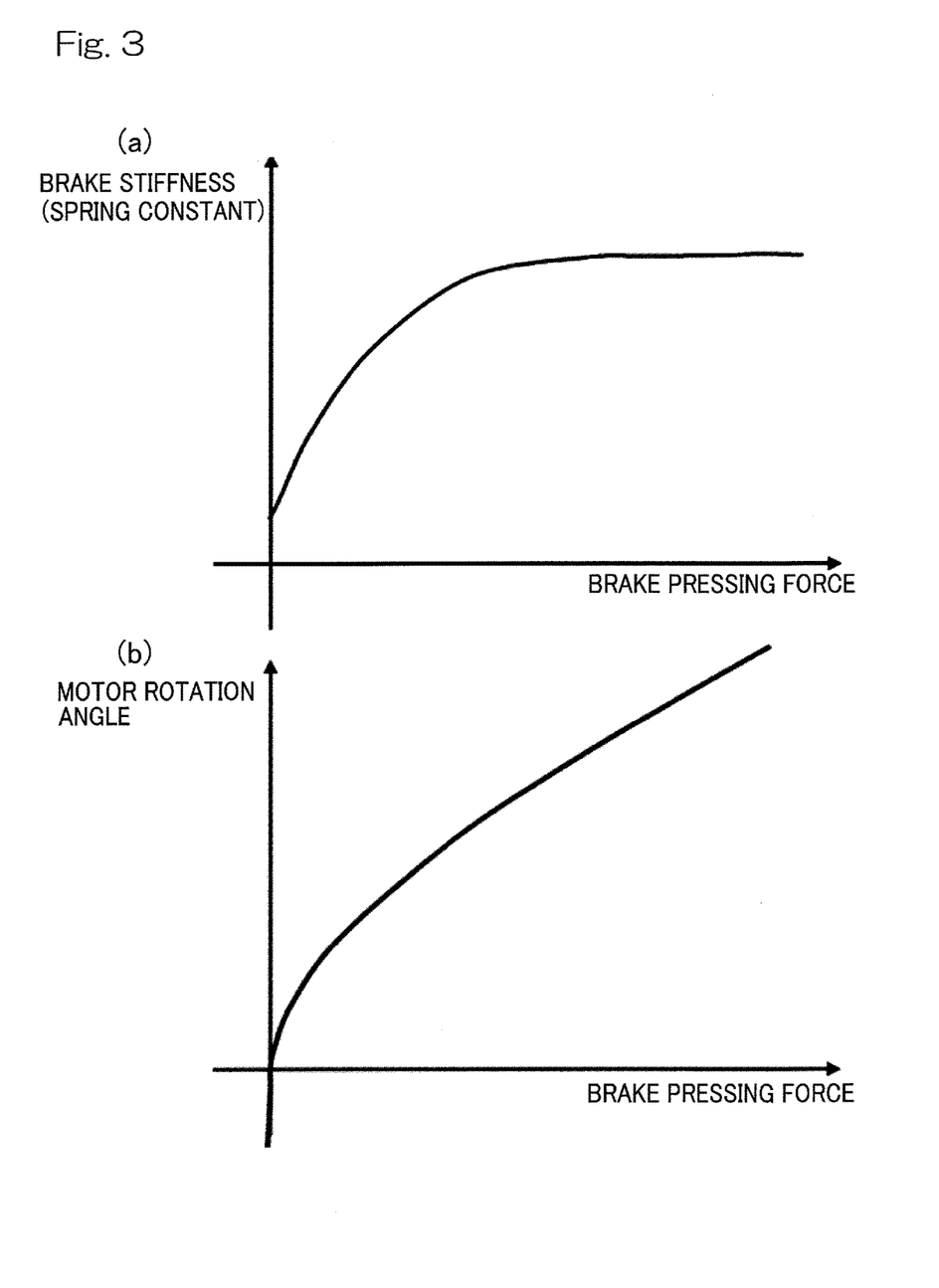
FIG. 3 illustrates a relationship between a brake pressing force and brake stiffness of the electric brake device, etc.

Next, the concept of stiffness of the electric brake device will be described. FIG. 3 illustrates a relationship between a brake pressing force and brake stiffness of the electric brake device, etc. Hereinafter, description will be made also with reference to FIGS. 1 and 2 as appropriate. As indicated in a graph (a) in FIG. 3, in general, as a brake pressing force increases, a spring constant increases. As indicated in a graph (b) in FIG. 3, due to influence of non-linear stiffness described above, the lower the brake pressing force is, the greater the increase of the motor rotation angle is. In a case where the motor rotation angle is controlled, when the value of the motor rotation angle increases, overflow of a variable may occur in control computing or the like. Therefore, the state quantity reset function unit 25 (FIG. 2) described above resets the motor rotation angle that is the state quantity.

Figure 4:
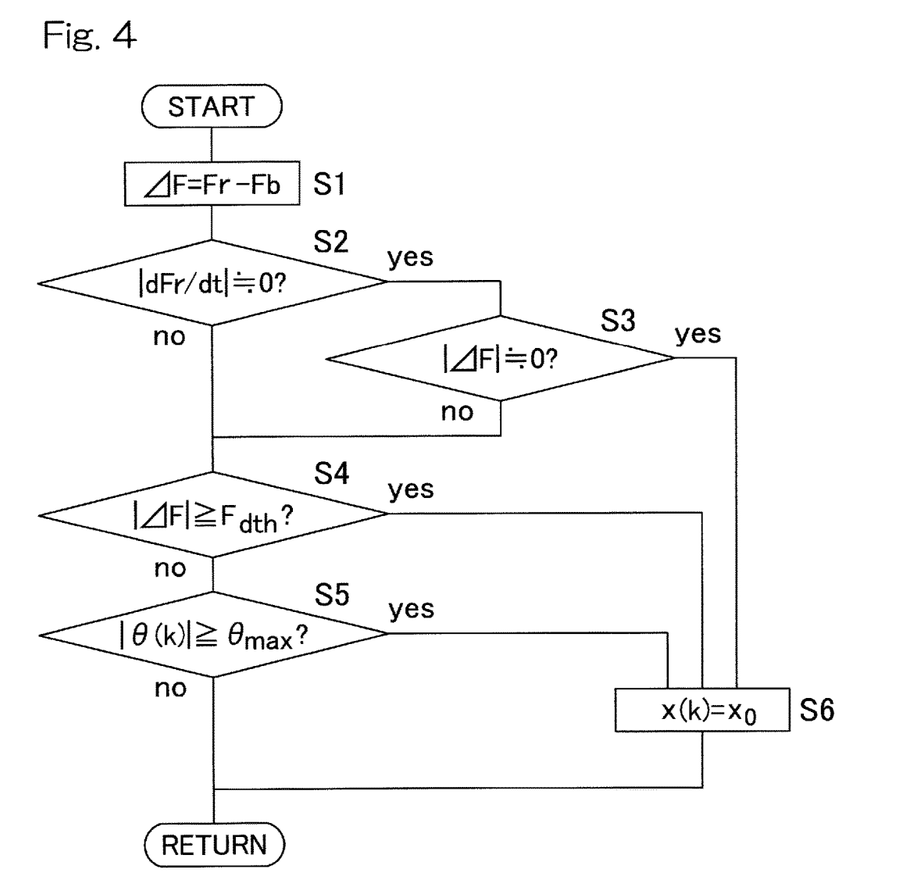
FIG. 4 is a flow chart showing an example of an operation performed by a state quantity reset function unit of the electric brake device.

FIG. 4 is a flow chart showing an example of an operation performed by the state quantity reset function unit 25. For example, after the electric brake device DB is powered on, this process will start. The state quantity reset function unit 25 calculates a deviation ΔF between the target braking force Fr obtained from the higher-order ECU 18 and the braking force estimated value Fb obtained from the braking force estimation unit 28 or the like (step S1). Next, when the condition that an absolute value |dFr/dt| of an amount of change of the target braking force is less than or equal to a set value A (step S2: yes) and an absolute value |ΔF| of the deviation ΔF between the target braking force Fr and the braking force estimated value Fb is less than or equal to a predetermined threshold value (for example, |ΔF|≈0 [i.e., |ΔF| approximately equals zero]) (step S3: yes), is satisfied as the predetermined condition, the state quantity reset function unit 25 resets the motor rotation angle that is the state quantity x(k) (step S6). The set value A may be such a very small value as to satisfy, for example, A≈0. In this case, the condition under which determination of step S2 is yes may be |dFr/dt|≈0.

In a case where such a branching is performed (step S2: yes and step S3: yes), it can be considered that the electric brake device DB maintains the braking force almost at a constant value. At this time, within a friction hysteresis loop of the electric brake device DB, even if the operation amount u(k) is varied according to the state quantity x(k) being reset, the braking force does not vary. Therefore, the state quantity x(k) can be reset without making brake feeling worse for a driver of the vehicle having the electric brake device DB mounted therein.

When the condition that the absolute value |dFr/dt| of the amount of change of the target braking force is greater than the set value A (step S2: no), or the condition that the absolute value |dFr/dt| of the amount of change of the target braking force is less than or equal to the set value A (step S2: yes) and the absolute value |ΔF| of the deviation ΔF is greater than the above-described predetermined threshold value (step S3: no), is satisfied as the predetermined condition, the state quantity reset function unit 25 shifts the process to step S4.

In a case where, in step S4, the absolute value |ΔF| of the deviation ΔF is greater than or equal to a predetermined threshold value $F_{dth}$ (step S4: yes), it can be considered that, by, for example, braking operation being abruptly performed, the electric brake device DB is operating at a very high speed. In this case, even if the operation amount u(k) is varied according to the state quantity x(k) being reset, a driver is less likely to perceive brake feeling worse. When the driving force, of the electric motor 4, determined on the basis of the deviation ΔF between the target braking force Fr and the braking force estimated value Fb is greater than or equal to a threshold value, specifically, when, for example, the operation amount u(k) is saturated due to the upper limit of a motor driving voltage, varying of the operation amount u(k) itself is less likely to occur. Therefore, the state quantity x(k) can be reset without making brake feeling worse for a driver of the vehicle having the electric brake device DB mounted therein (process is shifted to step S6).

In a case where, in step S4, the absolute value |ΔF| of the deviation ΔF is less than the predetermined threshold value $F_{dth}$ (step S4: no), the process is shifted to step S5. In a case where, in step S5, an absolute value |θ(k)| of the motor rotation angle θ(k) is greater than or equal to a threshold value $θ_{max}$ (step S5: yes), the condition of the state quantity reset occurrence in the above step is not satisfied, and there is a risk of occurrence of overflow of the motor rotation angle θ. Therefore, the state quantity reset function unit 25 forcibly resets the motor rotation angle that is the state quantity x(k) (step S6). After that, the process is ended.

Figure 5:
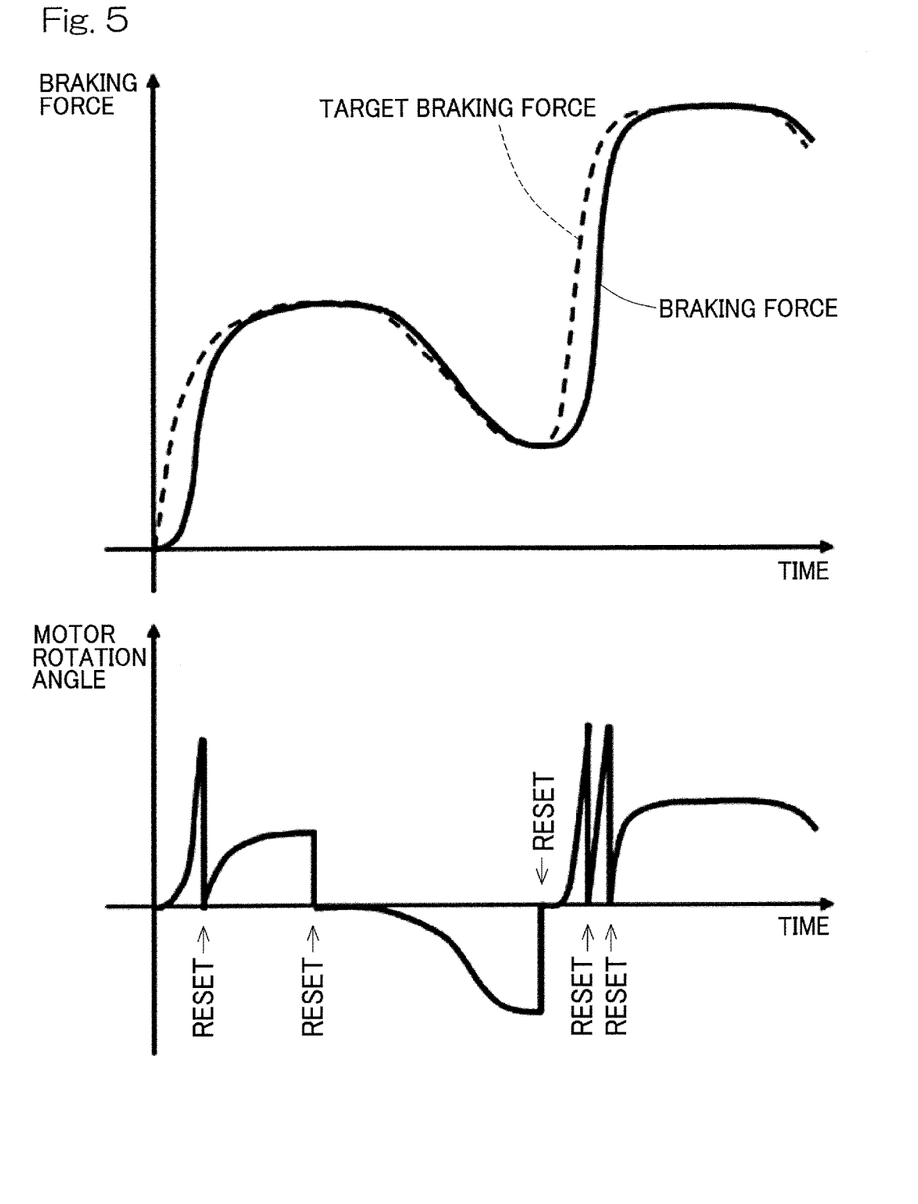
FIG. 5 schematically illustrates an example of an operation performed by the state quantity reset function unit.
Figure 6:
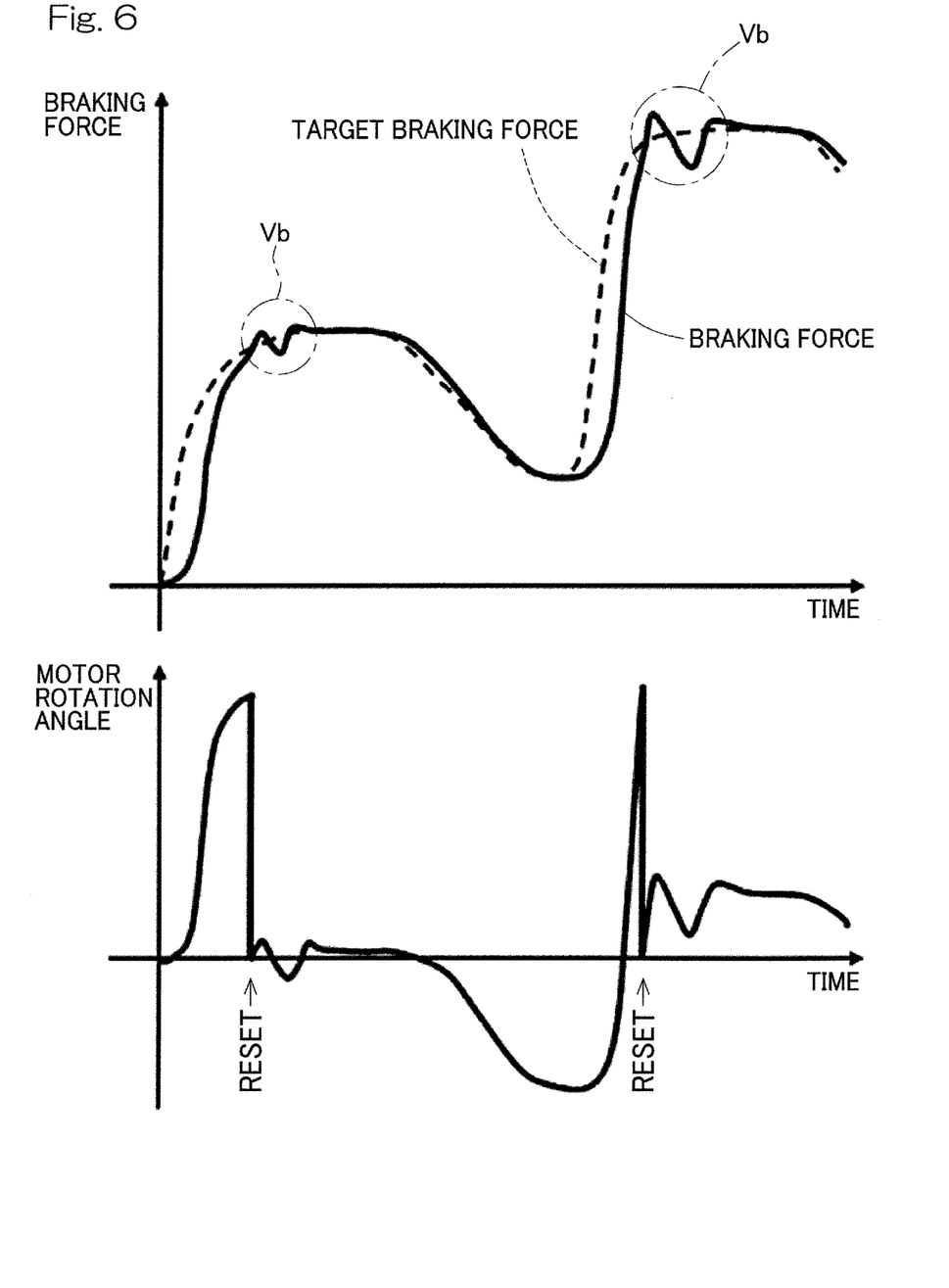
FIG. 6 schematically illustrates a case where a state quantity is reset according to occurrence of overflow in a conventional art.

FIG. 5 schematically illustrates an example of the operation performed by the state quantity reset function unit 25. FIG. 6 schematically illustrates a case where a state quantity is reset according to occurrence of overflow in a conventional art. In each of FIGS. 5 and 6, respective upper illustrations represent time response of the braking force (indicated by a solid line) against a command value (target braking force: indicated by a dotted line) of the braking force. In each of FIGS. 5 and 6, respective lower illustrations represent change of the motor rotation angle corresponding to the respective upper illustrations. In each of FIGS. 5 and 6, in the lower illustrations, the state quantity is reset at portions (indicated by arrows) where the motor rotation angle is sharply changed to zero.

In FIG. 5, when the state quantity reset function unit 25 resets the motor rotation angle that is the state quantity, great influence, on the braking force, such as rapid changing of the braking force does not occur due to the above-described reason. Meanwhile, in FIG. 6 that shows a conventional art, a vibration Vb (indicated by a single dotted line) slightly occurs in the braking force due to an operation amount being varied according to the motor rotation angle being reset. This vibration is likely to make brake feeling worse, in, for example, a vehicle having an electric brake device mounted therein, due to instantaneous braking shock or worse operation noise of the electric brake device.

In the electric brake device DB described above, the control device 2 controls the electric motor 4 so as to perform a follow-up control of the braking force with respect to the target braking force. The control device 2 has the control system in which the motor rotation angle is included in the state quantity in the follow-up control, and a linear control system can be thus obtained. Therefore, as compared to a conventional art in which a control parameter includes a non-linear spring constant formed of stiffness of an electric brake device, the control system can be more easily designed.

Since the control device 2 has the control system in which the motor rotation angle is included in the state quantity in the follow-up control, a problem arises that a value of the motor rotation angle becomes very large. However, the state quantity reset function unit 25 resets the motor rotation angle that is the state quantity as described below, and the problem can be thus prevented. In the control device 2, the state quantity reset function unit 25 resets at least the motor rotation angle to the predetermined value, on the basis of the predetermined condition using at least one of the target braking force, the braking force estimated value, the amount of change of the target braking force, the amount of change of the braking force estimated value, and the deviation between the target braking force and the braking force estimated value.

Thus, increase of calculation load can be inhibited, and occurrence of overflow of a variable can be prevented. The state quantity reset function unit 25 resets the motor rotation angle when a condition that is less likely to influence brake feeling is satisfied as the predetermined condition. Therefore, even if an operation amount is varied according to the motor rotation angle being reset, a driver is less likely to perceive brake feeling worse. Therefore, the electric brake device DB allows the control system to be easily designed without making brake feeling worse.

In the present embodiment, although an exemplary case where the state feedback controller 29 is implemented is described, another control manner may be used. For example, a PID series compensator may be used, or a switching-type non-linear compensator in, for example, a sliding mode may be used. As an equation in the equation calculation unit 21 which includes a state transition matrix, a state transition model may be used.

For example, the state quantity reset function unit 25 may perform such a process as to prevent the state quantity x(k) from being reset again within a predetermined time period after the state quantity x(k) has been reset, in order to prevent the state quantity from being frequently reset. Alternatively, the state quantity reset function unit 25 may perform such a process as to prevent the state quantity x(k) from being reset again in a case where the braking force for which resetting of the state quantity x(k) has occurred is within a predetermined range of the braking force.

Although the present invention has been fully described in connection with the preferred embodiments thereof with reference to the accompanying drawings, the embodiment disclosed herein is illustrative and not restrictive in all aspects. The scope of the invention is determined by the appended claims rather than the above description. Those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

REFERENCE NUMERALS

2 . . . control device
4 . . . electric motor
6 . . . linear motion mechanism (friction member contactor)
8 . . . brake rotor
9 . . . friction member
25 . . . state quantity reset function unit
28 . . . braking force estimation unit

What is claimed is:

1. An electric brake device comprising:
a brake rotor;
a friction member configured to be brought into contact with the brake rotor;
a friction member contactor configured to bring the friction member into contact with the brake rotor;
an electric motor configured to drive the friction member contactor;
a braking force estimation unit configured to obtain an estimated value of a braking force generated by the friction member being pressed against the brake rotor; and
a control device configured to control the electric motor to perform a follow-up control of the braking force with respect to a target braking force, wherein
the control device has a control system in which a motor rotation angle of the electric motor is included in a state quantity in a control computing of the follow-up control, and
the control device includes a state quantity reset function unit that resets at least the motor rotation angle to a predetermined value, on the basis of a predetermined condition using at least one of the target braking force, the estimated value of the braking force, an amount of change of the target braking force, an amount of change of the estimated value of the braking force, and a deviation between the target braking force and the estimated value of the braking force,
wherein the state quantity reset function unit of the control device resets at least the motor rotation angle to the predetermined value, when a condition that an absolute value of the amount of change of the target braking force is less than or equal to a set value that is not zero, and an absolute value of the deviation between the target braking force and the estimated value of the braking force is less than or equal to a threshold value that is not zero, is satisfied as the predetermined condition.

2. The electric brake device as claimed in claim 1, wherein the state quantity reset function unit of the control device resets at least the motor rotation angle to the predetermined value, when a condition that one or both of:
the absolute value of the deviation between the target braking force and the estimated value of the braking force and
a driving force, of the electric motor, determined on the basis of the deviation, is greater than or equal to a threshold value, is satisfied as the predetermined condition.

3. The electric brake device as claimed in claim 1, wherein the state quantity reset function unit of the control device forcibly resets at least the motor rotation angle when at least the absolute value of the motor rotation angle is greater than or equal to a threshold value.

* * * * *